Jan. 31, 1928.  1,657,897
R. S. PEABODY ET AL
ROAD DRAG AND GRADER
Filed Jan. 24, 1927  2 Sheets-Sheet 1
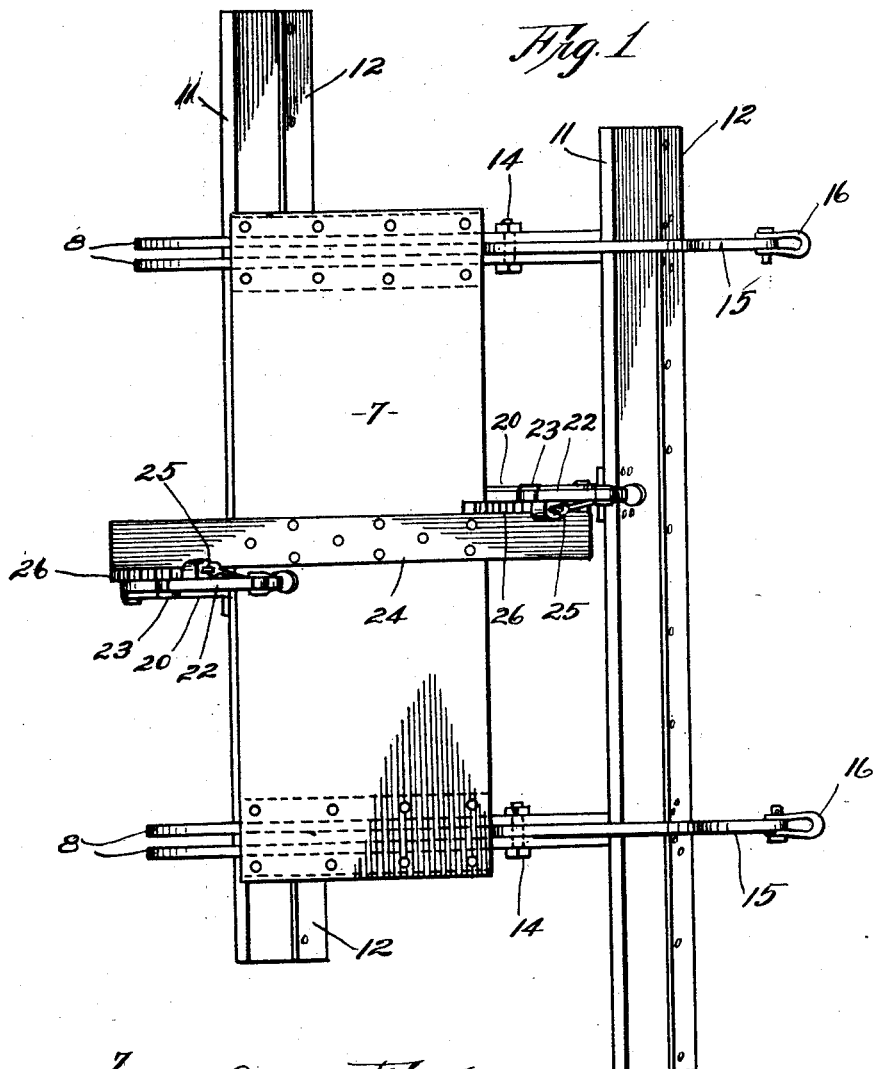
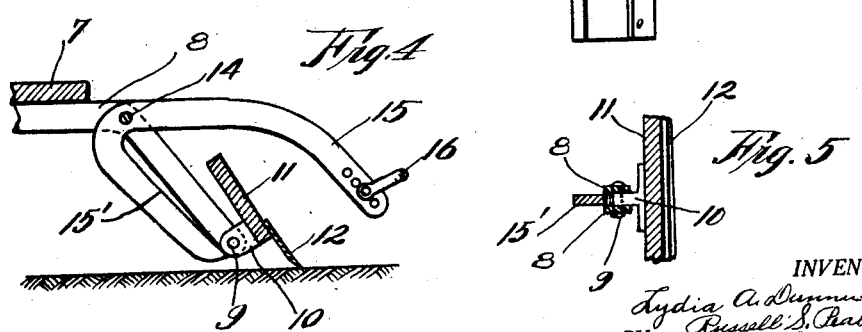
INVENTORS:
Lydia A. Dummuck and
Russell S. Peabody.
BY Thorpe & Gerard,
their ATTORNEYS.
Witness:
R. E. Hamilton

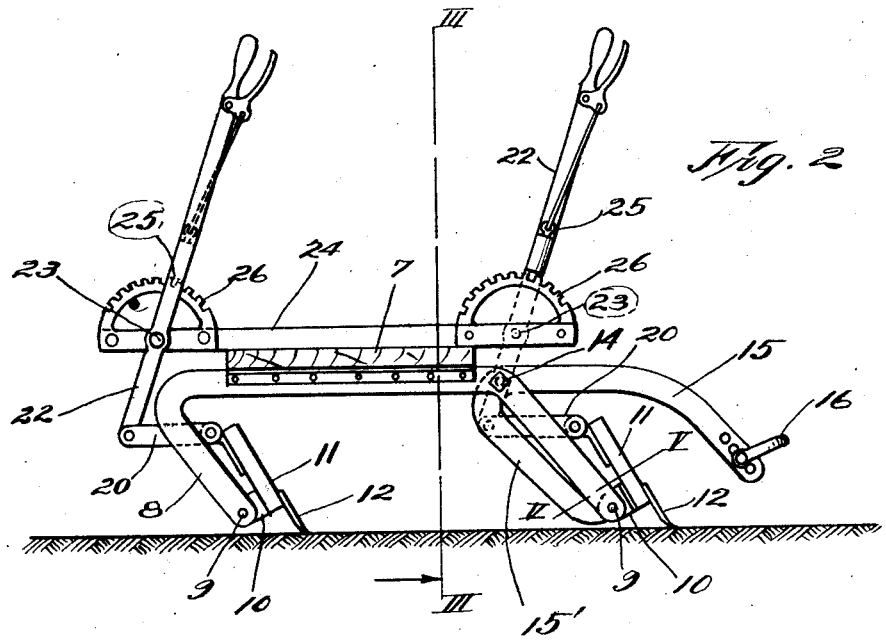
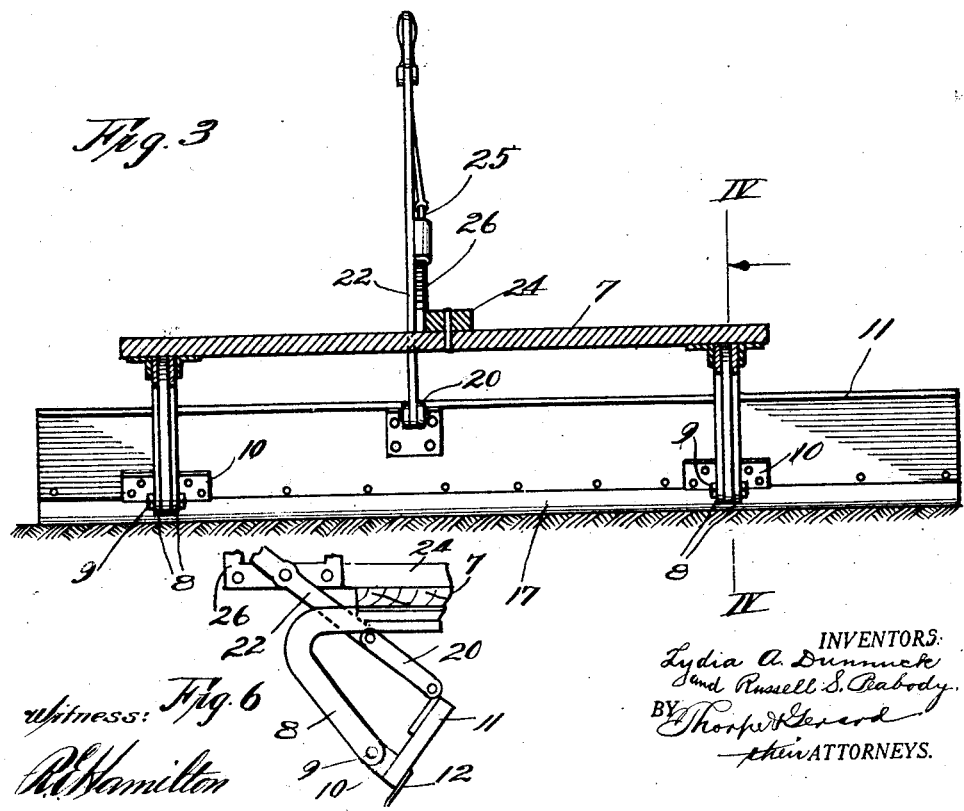

Patented Jan. 31, 1928.

1,657,897

UNITED STATES PATENT OFFICE.

RUSSELL S. PEABODY AND LYDIA A. DUNNUCK, OF LEAVENWORTH, KANSAS; SAID RUSSELL S. PEABODY ASSIGNOR TO S. PEABODY, OF LEAVENWORTH, KANSAS.

ROAD DRAG AND GRADER.

Application filed January 24, 1927. Serial No. 163,181.

The present invention relates to grading and dragging apparatus, such as devices intended to be used for road grading and dragging operations, as well as for scraping operations as in clearing roads or other passageways of snow, and one of the principal objects in view is to provide a combined drag and grading device comprising one or more grading members so mounted as to be adjusted into either a cutting position for effecting the grading operation, or into an oppositely inclined position adapted for dragging purposes.

In its preferred construction, the apparatus comprises a pair of grading members each of which is provided with connections for varying its operative position, and whereby said grading members may be separately and independently adjusted for causing both of the grading members to effect the same operating function, or for causing them to effect different functions, according to particular conditions of operation.

A further object of the invention is to provide an apparatus of this character in which the grading member is so mounted as to rock, for its adjustment, about a horizontal axis located below the middle longitudinal line of the grading member, for greater efficiency in its operation.

Another feature of the invention is the provision of a draft member which is pivotally connected to the framework of the apparatus intermediate the ends of the draft member, and including a free projecting arm extending in position for engagement with the framework at a point corresponding to the pivotal connection of said framework with the grading member, for the purpose of producing a downward thrust with reference to the rear portion of the apparatus, and maintaining it in effective engagement with the roadbed.

With the foregoing general objects in view, the invention will now be described by reference to the accompanying drawings illustrating one form of embodiment which we have devised for embodying the proposed improvements, after which those features and combination deemed to be novel will be particularly set forth and claimed.

In the drawings—

Figure 1 is a plan view of an apparatus constructed in accordance with the present invention;

Figure 2 is a side elevation of the same;

Figure 3 is a vertical sectional view, taken on the line III—III of Figure 2;

Figure 4 is a vertical sectional view, representing a section taken on the line IV—IV of Figure 3;

Figure 5 is a detail section, taken on the line V—V of Figure 2; and

Figure 6 is a detail view showing the rear grading member shifted into position for dragging.

Referring now to the drawings in detail, these illustrate the improved apparatus as comprising a framework made up of a horizontal platform member 7 secured upon a pair of frame pieces 8 at each end of said platform member 7, each pair of frame pieces 8 being spaced apart, as illustrated in Figure 1, and having their end portions projecting downwardly and forwardly, as illustrated in Figure 2, for pivotal connection, as indicated at 9, at their ends with brackets 10 attached to the rear faces of the grading members 11. Each grading member 11 includes also a blade element 12 secured to its lower edge, and preferably the brackets 10 of each grading member are secured to the lower rear faces of the members 11, or at points adapted to bring the pivotal axis of each grading member below its middle longitudinal line as clearly represented in Figures 2 and 4.

Also pivotally mounted, as indicated at 14, between the forward portions of each pair of frame pieces 8 is an approximately U-shaped draft member or bar 15 provided with the adjustable clips 16, the intermediate portion of each draft bar 15 being attached to the pivot bolts 14, and leaving a free downwardly and forwardly projecting arm 15′ extending in position for engagement with the pivot or bracket connection between the grading member and the forward end of said frame pieces. By this construction, the pull or draft upon the draft bar 15 causes the arms 15' to engage directly at the pivotal connections between the frame pieces 8 and the forward draft members, thus limiting the pivotal movement of the draft bars, and causing any lifting action to produce a downward thrust upon the rear end portions of the framework and the draft or grading member carried thereby, and operating therefore to maintain the latter in effective engagement with the roadbed.

For varying the position of the grading members, the upper margin of each member is provided with a link 20 pivotally connecting it with the lower end of a lever 22 which is pivotally mounted at 23 to one end of a frame piece 24 secured to the top of the platform frame member 7, as illustrated in Figures 1, 2 and 3. Each of the levers 23 is provided with the usual latch element 25 engaging a rack or segment 26, whereby said levers may be secured in any desired position of adjustment.

In the operation of the apparatus, after a suitable draft hitch has been made to the clips or clevises 16, the driver mounting the platform member 7, the grading members 11 with the blades 12 are tilted to the proper angle, according to the conditions of operation, by means of the levers 22 and latched in adjusted position. The method of mounting the grading members, with their pivotal points 9 below the middle longitudinal line of the grading members, causes the power to be applied to the grading members at the most effective points for maintaining the blades in engagement with the surface being operated upon, and the extension arms 15' from the draft members being also arranged to engage at the pivot points 9 of the front or forward grading members is also designed to carry out the draft in such a way as to maintain the rear grading members in effective working position, since any lifting tendency of the forward part of the apparatus will simply be transmitted in such a way as to exert a downward thrust upon the rear portion of the apparatus and hence keep the corresponding grading members in effective engagement with the roadbed. The adjustable mounting for the grading members is designed to permit of any desired adjustment of their working position, so that the blades 12 will be presented at a more or less acute angle with reference to the roadbed, or this angle can be increased to such an extent as to throw either or both of the grading members out of grading position into a more or less oppositely tilted position for effecting a dragging operation. This altered position of the rear grading member is illustrated by the detail view in Figure 6, where the rear grading member is shown in forwardly tilted position, into which position it may be of course placed independently of the working position of the forward grading member. This independent adjustment of the grading members is an important advantage in that the working action of the grading members can be distributed or somewhat evenly divided between these two members, as under certain conditions the operation can be carried out better by allowing the forward grading member to be positioned properly for performing only a part of the grading operation, as by effecting a relatively shallow cut, leaving the balance of the grading action to be carried out by the rear grading member, which would be the operation to be desired in a road surface having an unusually large number of chuckholes, and therefore of a very uneven character. The tendency of the rear portion of the apparatus, including the rear grading member, to be pried out of position by the pull or draft, is reduced to a minimum by the form and arrangement of the draft members or bars 15, with their extensions 15', since the tendency of this arrangement would be to lift the forward portion of the apparatus rather than the rear, thereby maintaining the rear grade member always in effective position. The arrangement of the connections for adjusting the grading members has the further important advantage of holding the grading members in working position and resisting the pressure applied to the front faces of the blades 12 by tensional stresses in the links 20, so that these connections serve to securely brace the grading members and it is possible to use lighter materials for these parts.

It is thus apparent that we have provided a practical and efficient construction for carrying out the desired objects of the invention, and while we have illustrated what we now regard as the preferred form of construction for embodying the invention we desire to reserve the right to make all such changes or modifications as may fairly fall within the scope of the appended claims.

What we claim is:

1. A combined drag and grading device comprising a framework, a grading member pivotally connected with said framework and adapted to rock about a horizontal axis below the middle longitudinal line of said member, a draft member pivoted intermediate its ends to said framework and having a free projecting arm adapted for engagement with the pivotal connection between said framework and grading member, and means carried by said framework for tilting said grading member and latching it in either backwardly inclined grading position or forwardly inclined position for dragging.

2. A combined drag and grading device comprising a framework, a pair of grading members pivotally connected to said framework at the front and rear thereof, respectively, and adapted to rock about horizontal axes below the middle longitudinal lines of said members, means for tilting said members about said axes, and a draft member pivoted intermediate its ends to said framework and having a free projecting arm adapted for engagement with the pivotal connection between said framework and the forward grading member.

In witness whereof we hereunto affix our signatures.

LYDIA A. DUNNUCK.
RUSSELL S. PEABODY.